United States Patent [19]
Gunn et al.

[11] Patent Number: 5,450,425
[45] Date of Patent: Sep. 12, 1995

[54] PROTOCOL FOR COMMUNICATION OF A DATA PACKET

[75] Inventors: Timothy D. Gunn; David A. Weinzierl, both of Mounds View; Dale W. Martenson, Shoreview, all of Minn.

[73] Assignee: Multi-Tech Systems, Inc., Mounds View, Minn.

[21] Appl. No.: 155,953

[22] Filed: Nov. 19, 1993

[51] Int. Cl.⁶ .......................... G06F 7/02; H04L 1/00
[52] U.S. Cl. ................... 371/67.1; 371/2.1; 371/20.4; 370/94.1; 340/825.16
[58] Field of Search .............. 371/67.1, 2.1, 20.4, 371/21.3, 68.2, 72, 29.1, 37.5; 395/575, 325, 200; 370/60, 94.1, 85.1, 84, 85.3, 58.1; 340/825.5, 825.34, 825.51, 825.16; 364/266.4, 268.9

[56] References Cited

U.S. PATENT DOCUMENTS

| | | | |
|---|---|---|---|
| 4,866,704 | 9/1989 | Bergman | 370/85.4 |
| 4,885,739 | 12/1989 | Read et al. | 340/825.5 |
| 4,922,486 | 5/1990 | Lidinsky et al. | 370/60 |
| 4,982,401 | 1/1991 | Box | 371/67.1 |
| 5,008,879 | 4/1991 | Fischer et al. | 370/85.2 |
| 5,187,787 | 2/1993 | Skeen et al. | 364/281.3 |
| 5,191,651 | 3/1993 | Halim et al. | 395/200 |
| 5,291,489 | 3/1994 | Morgan et al. | 370/85.1 |
| 5,321,813 | 6/1994 | McMillen et al. | 395/200 |

Primary Examiner—Robert W. Beausoliel, Jr.
Assistant Examiner—Dieu-Minh Le
Attorney, Agent, or Firm—Schwegman, Lundberg & Woessner

[57] ABSTRACT

A system, apparatus, and method for fault-tolerant communication of data embodied in a packet. The communication includes transmission of a starting sequence signal, the starting sequence signal including a first character string followed by a second character string. Transmitting the packet of information after the starting sequence signal has been transmitted, and transmitting an ending sequence signal after the packet has been transmitted, the ending sequence signal including a third character string followed by a fourth character string. The present invention also includes receiving the starting sequence signal transmitted from the transmitting means, and comparing the first and second character strings for the starting sequence signal to first and second pre-determined character strings. A buffer is reset so that it may receive the packet if the first and second character strings match the first and second pre-determined character strings, respectively. Once the buffer is reset, the ending sequence signal is received and the third and fourth character strings of the ending sequence signal are compared to third and fourth pre-determined character strings. If the third and fourth character strings match the third and fourth pre-determined character strings, respectively, the received packet is processed. If the third and fourth character strings do not match the third and fourth pre-determined character strings, the packet is disregarded.

22 Claims, 5 Drawing Sheets

PROTOCOL FOR COMMUNICATION OF A DATA PACKET

TECHNICAL FIELD

The present invention relates generally to a system, apparatus, and method for transmitting a data packet, and more particularly to a system, apparatus, and method for using a protocol in the transmission of a data packet.

BACKGROUND

The information age has changed the way in which people conduct business. In the early history of the country, the ability to exchange information was limited by the old letterpress-type of printing press, the capability of the United States Postal Service, and personal messenger services. Technology such as the telegraph and telephone eventually allowed corporations and people to more easily exchange information over long distances. In modern times, the evolution of computer technology is revolutionizing both business and the ability to exchange information by allowing people to easily communicate around the world.

Today, businesses are constantly finding new uses for computers. The reason for this phenomenon is two-fold. First, more people are learning how to fluently use computers; second, a growing number of consumers are getting access to their own personal computers (PC).

Many of the new uses that businesses are implementing require computers in remote locations to communicate with one another. Current examples include transferring information from one computer at one location to another computer at a different and remote location; allowing employees to communicate with one another through electronic mail, even if the employees are at different geographic locations; allowing customers to purchase goods and pay bills from their home computers; etc. Additionally, individual people are using their personal computers to shop, pay bills, and access databases with large amounts of information such as consumer guides, magazines, and stock market information.

A modem is the device that allows one computer to communicate with another computer and thus is an integral link in the communication system between two computers such as a PC and a main frame computer. The difficulty is that a single main frame computer may need the capacity to simultaneously handle hundreds of different users that are located in remote locations, and a single modem is required for each communication link. Therefore, a single main frame may require hundreds of modems.

As a result of this need, current technology provides the ability to place a plurality of modem cards on a rack and connect the rack to a single main frame computer. An example of such equipment includes an MT1432MR MultiModem card, which includes three modems. An example of a rack is the CC4800 MultiModemManager rack, which can support up to sixteen MultiModem cards. Therefore, each rack can support up to a total of 48 modems. Additionally, up to 254 racks can be networked so that a total of 12,192 modems can be connected to a single main frame or computer network. This equipment is manufactured by MultiTech Systems, Inc., of Moundsview, Minn.

The rack also supports a controller card that interfaces between the network of modems and a single manager PC. An example of such a controller card is the MR4800 rack controller module also manufactured by MultiTech Systems, Inc. The manager PC and controller card permit a technician or systems manager to track usage and various other kinds of information relating to the modems. They also allow a technician to automatically configure the modems without having to manually set each modem.

However, there is a shortcoming with the present technology. Large systems that use a large number of modems are running 24 hours a day. Thus, technicians cannot shut the system down in order to perform repairs and maintenance, and modem cards are removed and inserted while the system is running. This action is called "hot plugging" modem cards. Hot plugging modem cards causes random characters and a great deal of noise to be transmitted to the controller card. As a result, the modem card may receive packets that contain errors. The difficulty is that there is not presently any way to determine whether a packet contains an error, and any faulty packets will be processed and forwarded to the manager PC, a potentially devastating result.

A faulty packet may cause a modem configuration to be incorrectly set or incorrect information to be recorded at the manager PC. These type of errors can cause additional difficulty for a technician who is troubleshooting the system. Moreover, a system manager may have faulty information by which to record and analyze the usage of the present system. This faulty information will cause difficulties in managing a computer system and forecasting future growth. The ultimate result in either of these scenarios is difficulty for the user who attempts to access the host through a remote PC or terminal.

Thus, there is a need for a fault tolerant system, apparatus, and method for transmitting a data packet. More particularly, there is a need for a system, apparatus, and method that is able to determine when a faulty packet is transmitted so that the receiving end will not accept the faulty packet. There is also a need for a system in which modem cards can be hot plugged. When applied to modem technology, such a system, apparatus, and method will prevent faulty information from being sent to the manager PC and will prevent a modem from being incorrectly configured.

SUMMARY

The present invention provides each packet of information with a unique starting sequence and a unique ending sequence. Additionally, the packet may contain information about the length of the packet and a checksum byte. The present invention can use the starting sequence and ending sequence in order to determine whether a valid packet was transmitted. The length of packet information and checksum byte are also helpful in error detection. Thus, the present invention makes it possible to hot plug a modem card with a significantly reduced risk of a faulty packet being communicated to the manager PC.

The present invention provides fault-tolerant communication of data embodied in a packet. More particularly, the communication includes transmission of a starting sequence signal, the starting sequence signal including a first character string followed by a second character string. Transmitting the packet of information after the starting sequence signal has been transmitted, and transmitting an ending sequence signal after the packet has been transmitted, the ending sequence signal including a third character string followed by a fourth character string.

The present invention also includes receiving the starting sequence signal transmitted from the transmitting means, and comparing the first and second character strings for the starting sequence signal to first and second pre-determined character strings. A buffer is reset so that it may receive the packet if the first and second character strings match the first and second pre-determined character strings, respectively.

Once the buffer is reset, the ending sequence signal is received and the third and fourth character strings of the ending sequence signal are compared to third and fourth pre-determined character strings. If the third and fourth character strings match the third and fourth pre-determined character strings, respectively, the received packet is processed. If the third and fourth character strings do not match the third and fourth pre-determined character strings, the packet is disregarded.

These and other advantages and features, which characterize the present invention, are pointed out with particularity in the claims annexed hereto and forming a further part hereto. However, for a better understanding of the invention, its advantages, and objects obtained by its use, reference should be made to the drawings, which form a further part hereto, and to the accompanying descriptive matter, which is illustrated and describes a preferred embodiment of the present invention.

DETAILED DESCRIPTION

A preferred embodiment of the invention will be described in detail with reference to the drawings, wherein like reference numerals represent like parts and assemblies throughout the several views. Reference to the preferred embodiment does not limit the scope of the invention, which is limited only by the scope of the claims interpreted according to the Doctrine of Equivalents.

The present invention is a system, apparatus, and method of using a protocol in the transmission of a packet of information. The protocol is designed to provide sync-capability to both the start and the end of the packet. The start of the packet is indicated by transmitting a starting sequence, which includes two distinct character strings such as a break signal and a starting sync-byte. The end of the packet is indicated by transmitting an ending sequence, which includes two distinct character strings such as a break signal and an ending sync-byte. In both instances, the sync-byte is transmitted after the break is received by the receiving end. Preferably, the sync-byte in the starting sequence is a different character string than the sync-byte in the ending sequence.

During the starting sequence, if the byte received after a break signal is the expected starting sync-byte, it is assumed that the next byte received is the start of the packet. If the byte received after the break signal is the ending sync-byte, the packet has not been correctly received and the receiving end should communicate to the transmitting end that the packet was not received. If the byte received after the break signal is an unexpected byte or a time-out occurs, all data received should be considered invalid and discarded.

If the information received after transmission of the packet is the ending sequence, the packet was properly received and the receiving end can communicate to the transmitting end that the packet was received. If a starting sync-byte was received rather than and ending sync-byte, there was an error in the packet and it is disregarded.

If a second break signal was received rather than the ending sync-byte, it is assumed that the packet was properly received and that the second break signal is actually the beginning of a new starting sequence. Thus, the receiving end will process the packet and go into a wait state for the starting sync-byte and the transmission of a new packet.

Figure 1:
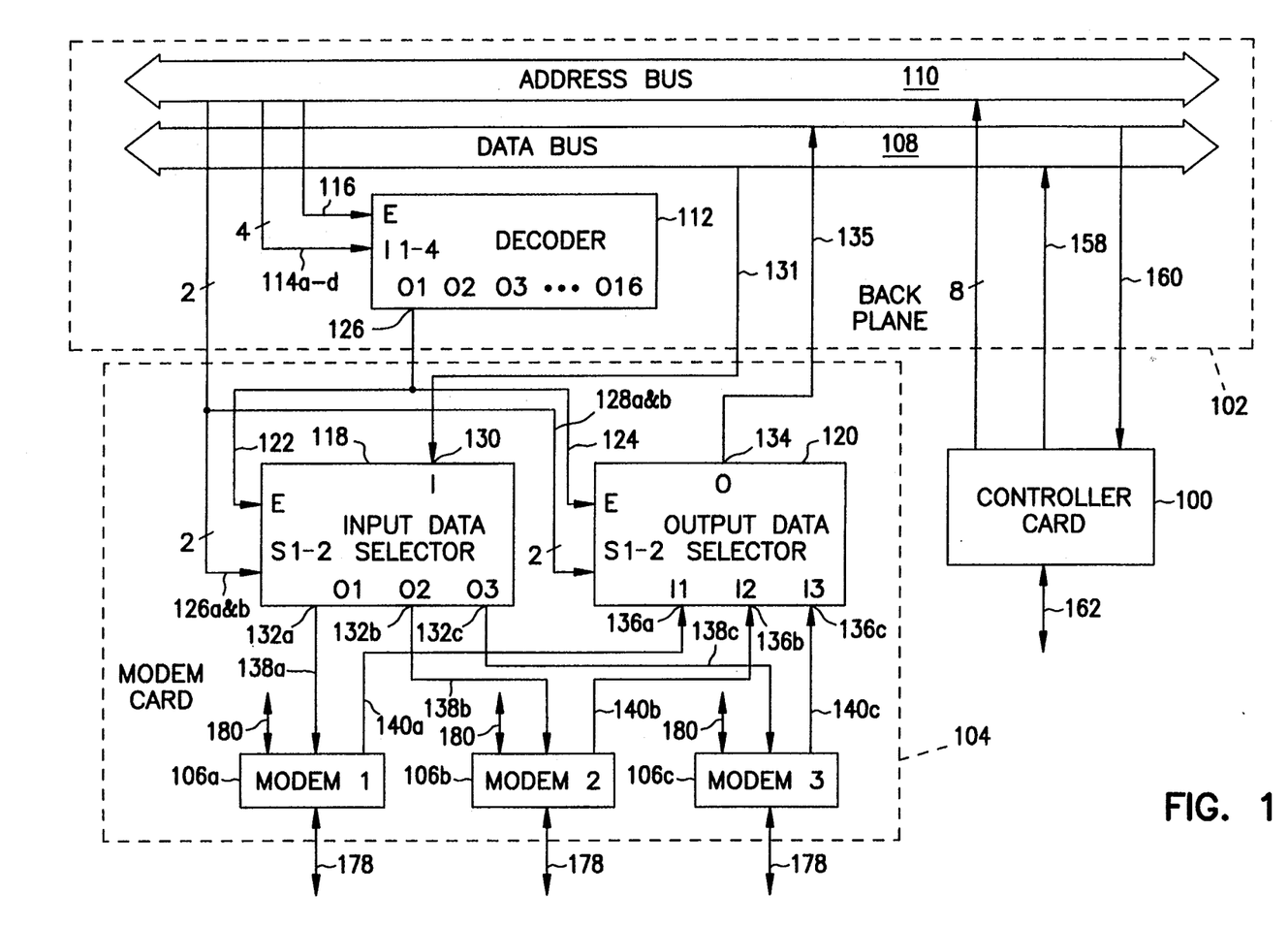
FIG. 1 is a functional block diagram showing the controller card, back plane, and modem card.

Referring now to the figures, there is illustrated preferred embodiments of the present invention, which allows the communication of packets of information between a modem and a manager PC. As shown in FIG. 1, the system consists of a controller card 100, back plane 102, and modem card 104 having three modems 106a–106c. Modem card 104 is one of 16 possible modem cards that may be connected to back plane 102. The back plane 102 includes an asynchronous serial data bus 108 and a parallel address bus 110, which is capable of transmitting an 8 bit address. As will be described below, bits 0–2 address the individual modems 106a–106c on a given modem card 104, and bits 3–7 address the modem card 104.

The back plane 102 further includes a 4 to 16 line decoder 112. Four select lines 114a–114d of the decoder 112 correspond to bits 3–6 of the address and an enable line 116 corresponds to bit 7.

The modem card includes a 1 to 3 line data selector/demultiplexer 118 and a 3 to 1 line data selector/multiplexer 120. For simplicity, the remaining specification will refer to the data selector/demultiplexer 118 as the input data selector and the data selector/multiplexer 120 as the output data selector. Both the input and output data selectors 118 and 120 have enable lines 122 and 124, respectively, that are connected to the same output 126 of the decoder 112 so that input and output data selectors 118 and 120 are enabled simultaneously.

The input data selector 118 has two select lines 126a and 126b that correspond to bit 0 and bit 1, respectively, of the address. The output data selector 120 also has two select lines 128a and 128b that correspond to bit 0 and bit 1, respectively, of the address. Therefore, each of the data selectors 118 and 120 receive the same address. One skilled in the art will realize that bit 3 of the address provides expansion capability so that a modem card that is attached to back plane 102 can include up to 8 modems. Input 130 of input data selector 118 is connected to data bus 108 by asynchronous serial data channel 131. Output 134 of output data selector 120 is connected to data bus 108 by asynchronous serial data channel 135.

The input data selector 118 has one input 130 and three outputs 132a-132c. The output data selector 120 has one output 134 and three inputs 136a-136c. The input 130 of the input data selector receives data from the data bus 108, and the outputs 136a-136c of the output data selector transmit data to the data bus 108.

In the preferred embodiment, as described above, the modem card 104 has first, second, and third modems 106a-106c. However, those skilled in the art will readily recognize that the actual number of modems per card is a matter of design choice. Each of the modems 106a-106c has an asynchronous serial data channel (input channel) 138a-138c, respectively, for receiving data and an asynchronous serial data channel (output channel) 140a-140c, respectively, for transmitting data.

The input channel 138a of the first modem 106a is connected to the first output 132a of the input data selector 118; the input channel 138b of the second modem 106b is connected to the second output 132b of the input data selector 118; the input channel 138c of the third modem 106c is connected to the third output 132c of the input data selector 118. Similarly, the output channel 140a of the first modem 106a is connected to the first input 136a of the output data selector 120; the output channel 140b of the second modem 106b is connected to the second input 136b of the output data selector 120; the output channel 140c of the third modem 106c is connected to the third input channel 136c of the output data selector 120. As will be described in more detail below, each modem 106a-106c further includes an asynchronous serial data channels 146a-146c to a host computer.

One skilled in the art will realize that back plane 102 will include a control bus for resetting modems 106a-106c, indicating modems 106a-106c are out-of-service or busy, indicating whether a modem card is connected to a particular output of the decoder 112, indicating the number of modems on the controller card 104, etc.

Figure 2:
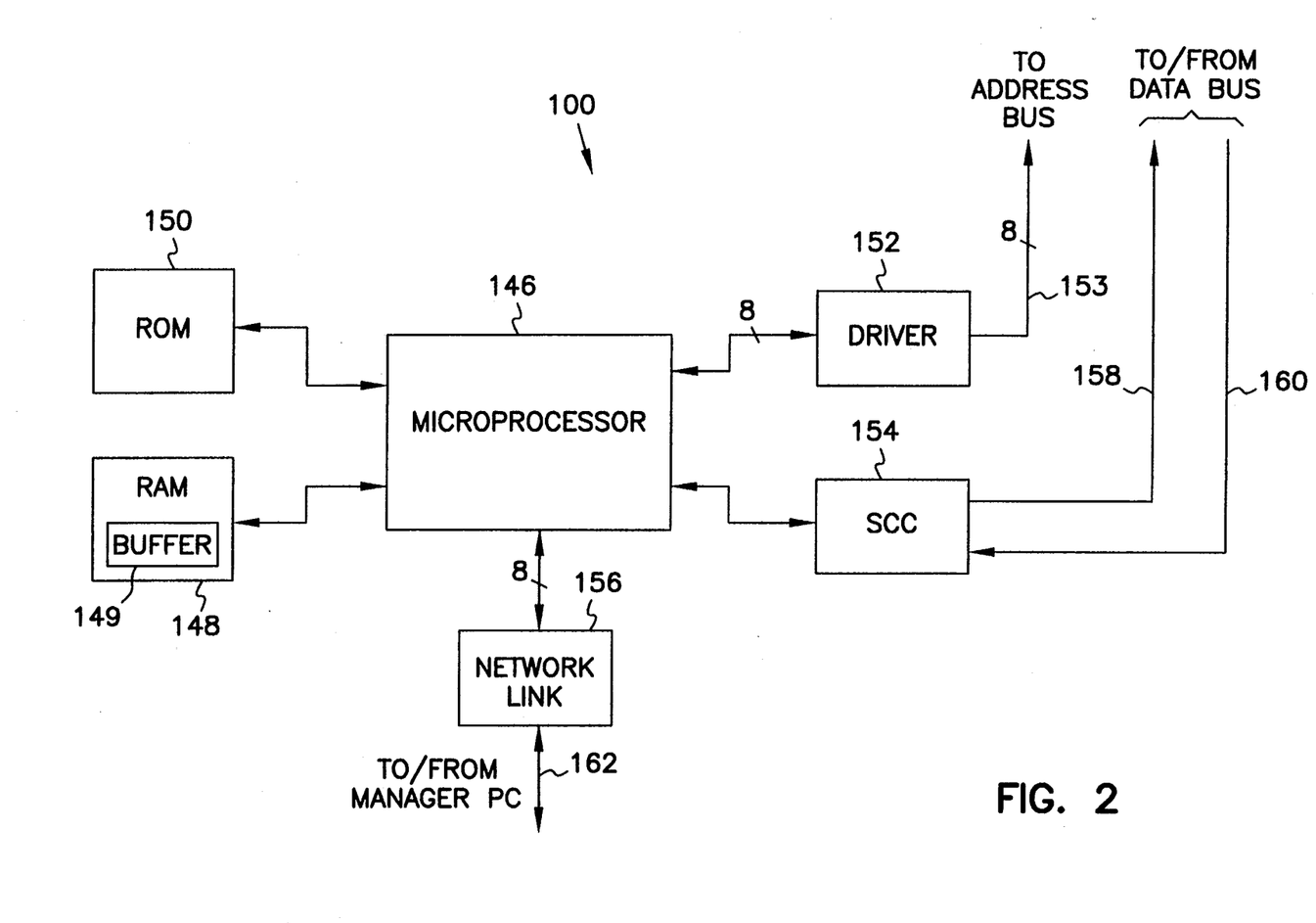
FIG. 2 is a functional block diagram of the components of the controller card shown in FIG. 1.

Referring to FIG. 2, the controller card 100 includes a microprocessor 146, RAM 148, ROM 150, a driver 152 for sending addresses via the address bus 110, a serial communication controller (SCC) 154, and a network interface 156. The preferred microprocessor is chip number Z80181, which is manufactured by Zilog, Inc. of Campbell, Calif. The preferred driver is chip number HCT245, which is manufactured by Texas Instruments. The driver 152 passes the addresses from microprocessor 146 to address bus 110 of back plane 102. The address passes from the driver 152 to the address bus 110 via 8-bit parallel address channel 153.

The SCC transmits packets of information from the microprocessor 146 to the data bus 108 via asynchronous serial data channel 158 and transmits information from the data bus 108 to the microprocessor 146 via asynchronous serial data channel 160. The preferred SCC is chip number 85C30, which is manufactured by Zilog, Inc.

Network interface 156 communicates information from microprocessor 146 to the manager PC via arcnet cable link 162. The information communicated to the manager PC includes the packet content 192, which is received from a modem 106a, 106b, or 106c. The fields included with the packets are described in detail below. The preferred network interface 156 is chip number COM90C65, which is manufactured by SMC.

Figure 4:
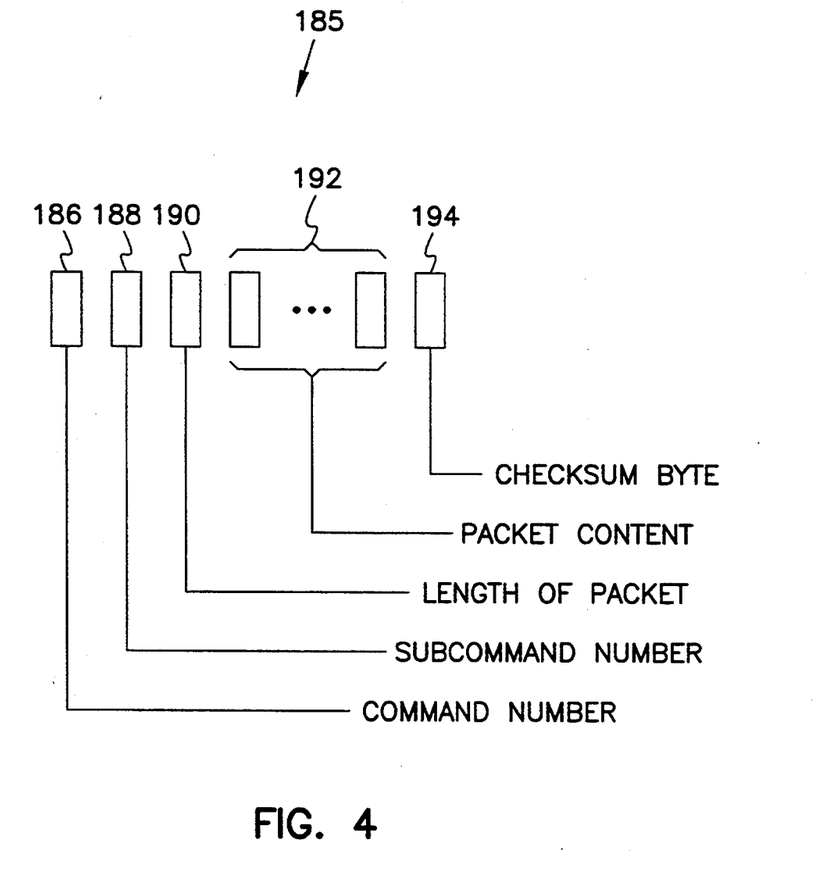
FIG. 4 shows the components of a packet of information that is transmitted between the controller card and modem card shown in FIG. 1.

The ROM 150 stores the program that drives the microprocessor, and the RAM 148 has a portion that is allocated for use as a buffer 149 to temporarily store the data packet, generally shown as 185 in FIG. 4, that is received from the modem. The action of temporarily storing the data packet 185 is described in more detail below.

Figure 3:
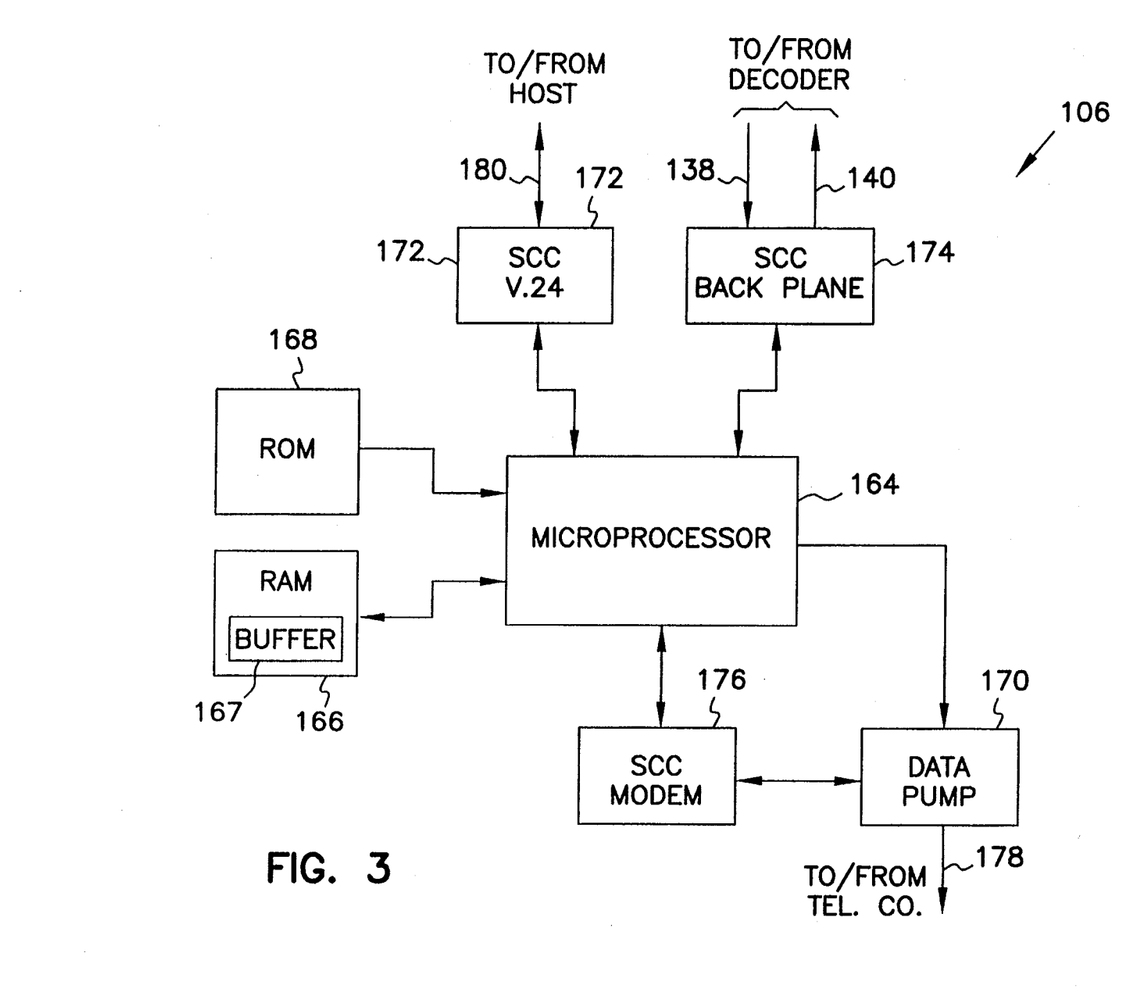
FIG. 3 is a functional block diagram of the components of the modem shown in FIG. 1.

Referring to FIG. 3, the first modem includes a microprocessor 164, RAM 166, ROM 168, data pump 170, a serial communication controller (SCC V.24) 172 for communication to and from the host, serial communication controller (SCC black plane) 174 for communications to and from the controller card 100 via the data bus 108 on the back plane 102, and serial communication controller (SCC modem) 176 for communication to the data pump 170. The preferred microprocessor is chip number Z80181, which is manufactured by Zilog, Inc.

The data pump 170 includes a digital signal processor (DSP) and a digital telephone coder-decoder (CODEC). The DSP and CODEC perform functions such as modulation, demodulation, and echo cancellation to communicate over a telephone line using a plurality of telecommunication standards including modem protocols. Thus, the data pump 170 transmits and receives signals across telephone line 178. The microprocessor 164 directly controls the data pump 170. Data received and transmitted by the data pump 170 is passed to and from the microprocessor 164 by the SCC modem 176.

The preferred SCC modem is chip number 85C30, which is manufactured by Zilog, Inc. The preferred data pump is chip set number HSM144, which is manufactured by AT&T Microelectronics. Data pumps are discussed in greater detail in U.S. patent application Ser. No. 08/003,467, filed Jan. 8, 1993 and entitled Computer-Based Multifunction Personal Communications System and in U.S. patent application Ser. No. 08/087,164, filed Jul. 2, 1993 and entitled Modem With Firmware Upgrade Feature, which are hereby incorporated by reference.

The SCC V.24 172 transmits information between the microprocessor 164 and the host computer via an asynchronous serial data channel 180. All transmissions between the SCC V.24 and the host computer are based on the V.24 standard. Thus data transmitted between the host computer and a remote terminal pass through asynchronous serial data channel 180, SCC V.24 172, microprocessor 164, SCC modem 176, data pump 170, and telephone line 178. The preferred SCC V.24 is chip number 85C30, which is manufactured by Zilog, Inc.

The SCC back plane 174 transmits packets of information from microprocessor 164 to the data bus 108 via asynchronous serial data channel 140 and transmits packets of information from the data bus 108 to the microprocessor 164 via asynchronous serial data channel 138. The preferred SCC back plane is chip number 85C30, which is manufactured by Zilog, Inc.

ROM 168 stores the program that drives the microprocessor. As described below, the ROM 168 also stores the event data, which may be communicated to the controller card 100. RAM 166 has a portion allocated for use as a buffer 167 to temporarily store data that is transmitted and/or received from either the controller card 100, the host, or a remote terminal via the telephone line 178.

In operation, the controller card 100 will sequentially poll all of the modems 106a-106c connected to the back plane 102. Polling is accomplished by sequentially transmitting the addresses across the address bus 110 so that bits 3-6 are transmitted to the select lines 114a-114d of the decoder 112 and bits 0 and 1 are transmitted to the select lines 126a and 126b of input data selector 118 and the select lines 128a and 128b of the output data selector 120. As the microprocessor 146 of the controller card 100 indexes through the first three addresses it causes the decoder 112 to enable the input and output data selectors 118 and 120 of the first modem card 104 and causes those input and output data selectors 118 and 120 to sequentially switch from the first modem 106a, to the second modem 106b, to the third modem 106c.

When the microprocessor 146 indexes to the fourth address, it causes the input and output data selectors 118 and 120 of the first modem card 104 to be not enabled and causes the input and output data selectors of the second modem card to be enabled. The individual modems of the second modem card are then polled. This sequence is repeated until the controller card 100 polls all of the modems that are connected to the back plane 102. After the last modem is polled, the sequence begins over again with the first modem 106a on the first modem card 104.

When an event occurs at a modem 106a, 106b, or 106c, the RAM 166 will hold information concerning the event until that modem 106a, 106b, or 106c is polled. Examples of events include, but are not limited to, a ring, connect, dialing, out-of-service, disconnect, etc. Once the modem 106a, 106b, or 106c is polled, microprocessor 164 of modem card 104 will transmit the information regarding the event to the SCC back plane 174 in a packet 185. The SCC back plane 174, in turn, transmits the packet 185 to the data bus 108 via asynchronous serial data channel 140. The packet 185 is transmitted using the protocol of the present invention. The protocol is described in detail below.

SCC 154 of controller card 100 receives the packet 185 from data bus 108 via asynchronous serial data channel 160 and then passes the packet 185 to microprocessor 146. Microprocessor 146 then temporarily stores the packet 185 in buffer 149. Upon successful transmission of the packet 185, the microprocessor 146 will transmit the packet content 192 to the manager PC via network interface 156 and arcnet cable link 162. The packet content 192 corresponds to the event that was initially stored in the RAM 166.

Referring to FIG. 4, each packet 185 consists of five components. The first component is the command number 186. The second component is the sub-command number 188. The command number 186 and sub-command number 188 are used to categorize the various packet 185 types. The third component is a length of packet byte 190 that indicates the number of bits within the packet. The fourth component is the content 192 of the packet, which corresponds to the event that is being communicated to the controller card 100. The fifth component is the checksum byte 194, which provides additional error detection.

Figure 5:
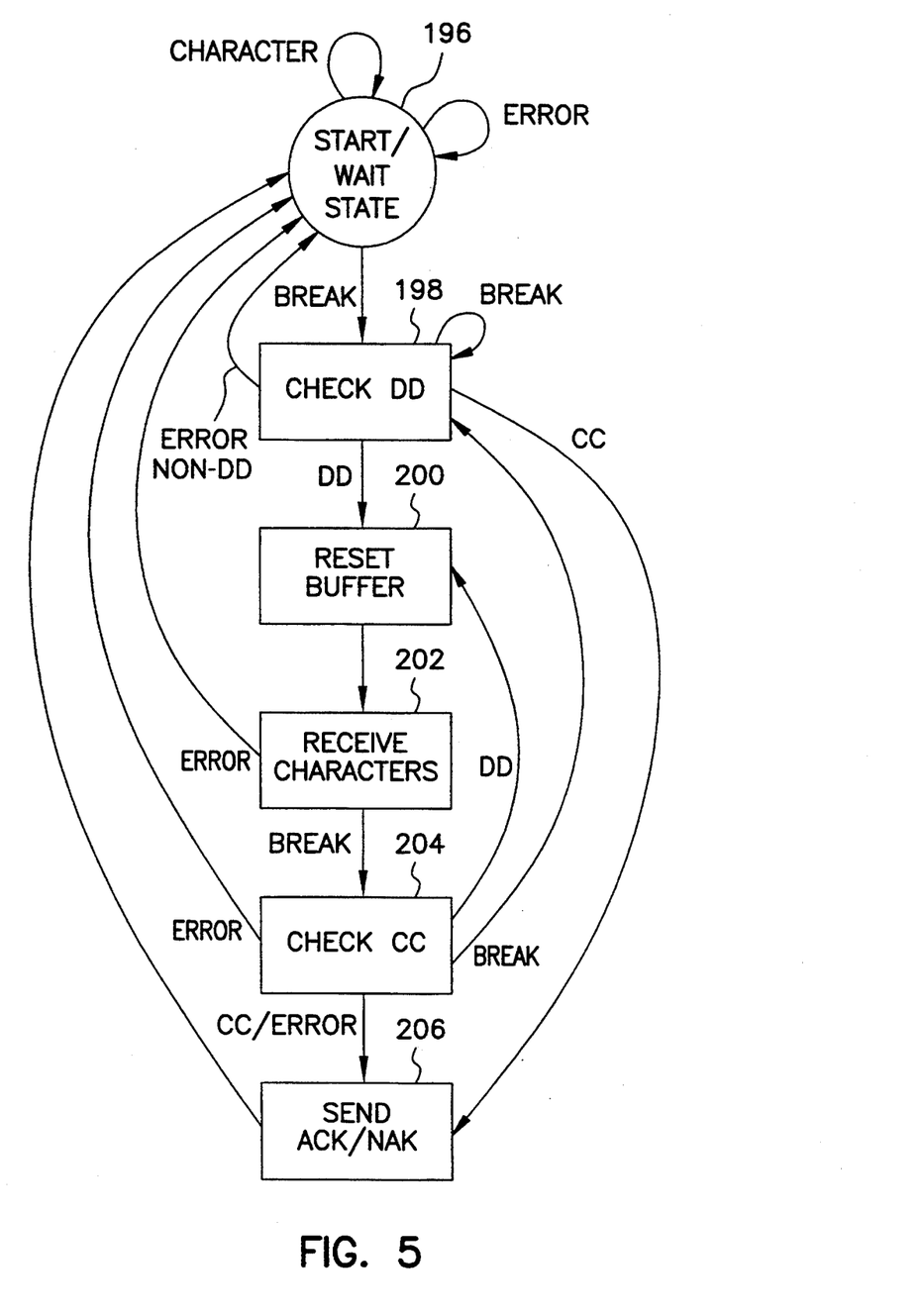
FIG. 5 is a state machine diagram showing the sequence of events that occurs during the transmission of a packet of information between the modem card and the controller card shown in FIG. 1.

FIG. 5 is a state machine diagram that represents the sequence in which the packet 185 is transmitted when the protocol of the present invention is used. Referring to circle 196, the controller card 100 is initially in a wait state in which it is waiting to receive a starting sequence. As described above, the starting sequence consists of a break signal followed by a starting sync-byte and indicates that the modem 106a, 106b, or 106c is going to send a packet 185. When an event occurs, the modem card 104 will initially transmit a starting sequence beginning with the transmission of a break signal that is two character lengths and is based on the CCITT X.28 standard. The break signal is transmitted at a frequency that is outside the bandwidth in which the packet 185 is transmitted. If a random character or an error is received, the controller card 100 will remain in the wait state until a break is received.

Referring to box 198, the controller card 100 will verify the character string received after the break signal to check whether it is the starting sync-byte. The starting sync-byte is preferably a unique character string such as a hexadecimal DD.

If the controller card 100 receives an ending sync-byte, it will send the modem a "not acknowledged" signal, box 200, to the modem 106a, 106b, or 106c and cause the modem 106a, 106b, or 106c to try to resend the packet 185 beginning with a new starting sequence. If an error or any character other than the starting sync-byte or ending sync-byte is received, the controller card 100 will return to a wait state and not accept any additional information until it receives a break signal indicating a new starting sequence. Circle 196. If a second break signal is received rather than the starting sync-byte, the controller card 100 will treat it as if it were a first break signal and continue to wait for a starting sync-byte to be transmitted from the modem 106a, 106b, or 106c.

Referring to box 200, upon receipt of the starting sync-byte, the controller card 100 will reset the buffer 149 so that it may receive the packet 185. As described above, the buffer 149 is actually an allocated portion of the RAM 148, and it is reset by microprocessor 146.

Referring to box 202, the controller card 100 will receive the packet 185 after the buffer 149 is reset. If the microprocessor 146 detects an error in the packet 185, the controller card 100 will not accept the packet content 192 and will return to a wait state until it receives a new starting sequence. In other words, the packet 185 will remain in the buffer 149 until the buffer 149 is reset, and the microprocessor 146 will not send the packet content 192 to the manager PC via the network interface 156 and the arcnet cable link 162. An example of an error that might occur during this point in the protocol sequence includes, but is not limited to, the possibility that the packet 185 contains more bits than are indicated by the length of packet byte 190.

The modem 106a, 106b, or 106c will transmit the ending sequence after transmission of the packet 185 is complete. As described above, the ending sequence consists of a break signal followed by an ending sync-byte. As in the starting sequence, the break signal is two characters in length and is based on the CCITT X.28 standard.

Referring to box 204, the controller card will verify any character received following the break signal to check whether the character string matches the ending sync-byte. The ending sync-byte is preferably a unique character string such as a hexadecimal CC.

If the starting sync-byte rather than the ending sync-byte is received, there was an error in the transmission of the packet 185 and the packet 185 is disregarded. The controller card 100 then resets the buffer 149 and awaits transmission of a new packet 185. Box 200. If a second break signal is received rather than a hexadecimal CC, it is assumed that transmission of the packet 185 was successful. The controller card will then process the packet 185 and the microprocessor 146 will transmit the packet content 192 to the manager PC via the network interface 156 and the arcnet link 162. If there is any other error in transmitting the ending sync-byte, the controller card 100 will disregard the packet 185 and return to a wait state until it receives a new break signal. Circle 196. Examples of errors include, but are not limited to, a time-out, receipt of a character string other than the starting sync-byte or ending sync-byte, etc.

Referring to box 206, if the ending sync-byte is properly received, the microprocessor 146 will check to see whether there are any errors in the packet 185. Examples of an error that might be detected include, but are not limited to, a checksum error, too few characters, etc. If there is an error, the controller card 100 will send a "not acknowledged" signal to the modem 106a, 106b, or 106c. The modem 106a, 106b, or 106c will then re-send the packet 185 beginning with the starting sequence. If there are no errors detected in the packet 185, the controller card 100 will process the packet 185 and the microprocessor 146 will transmit the packet content 192 to the manager PC via the network interface 156 and the arcnet link 162. The controller card 100 will then send an "acknowledged" signal to the modem 106a, 106b, or 106c and return to a wait state. Circle 196.

While the invention has been described in conjunction with a specific embodiment thereof, it is evident that different alternatives, modifications, and variations will be apparent to those skilled in the art in view of the foregoing description. Accordingly, the invention is not limited to these embodiments or the use of the elements and a specific configurations and shapes as presented herein.

The invention that we claim is:

1. A system for fault-tolerant communication of data embodied in a packet having a number of bits, the system comprising:
    a) transmission means for transmitting signals, the transmission means having
        i) means for transmitting a starting sequence signal, the starting sequence signal including a first character string followed by a second character string,
        ii) means for transmitting the packet of information after the starting sequence signal has been transmitted,
        iii) means for transmitting an ending sequence signal after the packet has been transmitted, the ending sequence signal including a third character string followed by a fourth character string; and
    b) receiving means for receiving signals that are transmitted from the transmission means, the receiving means having
        i) means for receiving the starting sequence signal transmitted from the transmitting means,
        ii) a buffer for receiving the packet,
        iii) means for comparing the first and second character strings of the starting sequence signal to first and second pre-determined character strings,
        iv) means for resetting the buffer so that it may receive the packet if the first and second character strings match the first and second pre-determined character strings, respectively,
        v) means for receiving the ending sequence signal transmitted from the transmitting means,
        vi) means for comparing the third and fourth character strings of the ending sequence signal to third and fourth pre-determined character strings,
        vii) means for accepting the packet if the third and fourth character strings match the third and fourth pre-determined character strings, respectively,
        viii) means for disregarding the packet if the third and fourth character strings do not match the third and fourth pre-determined character strings.

2. The system of claim 1 wherein the receiving means further comprises:
    a) means for processing the received packet if the third and fourth character strings both match the third pre-determined character string; and
    b) means for resetting the buffer if the third and fourth character strings both match the third pre-determined character string.

3. The system of claim 1 wherein the packet contains a field that corresponds to the number of bits in the packet, further wherein the receiving means has means for disregarding the packet if it has too many bits.

4. The system of claim 3 further wherein the receiving means has means for disregarding the packet if it has too few bits after the ending sequence is successfully received.

5. The system of claim 1 wherein the packet has a checksum field, further wherein the receiving means has means for disregarding the packet if there is a checksum error.

6. The system of claim 1 wherein the first and third pre-determined character strings correspond to break interrupts, the second pre-determined character string corresponds to one pre-determined hexadecimal character, and the fourth pre-determined character string corresponds to another pre-determined hexadecimal character.

7. The system of claim 6 wherein the packet is transmitted at a predetermined bandwidth, further wherein the first and third character strings are transmitted outside the bandwidth and the second and fourth character strings are transmitted within the bandwidth.

8. A fault-tolerant communications apparatus for receiving signals from a transmitter of a type that (i) transmits a starting sequence signal, wherein the starting sequence signal includes a first character string followed by a second character string, (ii) transmits a packet of information having a number of bits, and (iii) transmits an ending sequence signal, wherein the ending sequence signal includes a third character string followed by a fourth character string, the apparatus comprising:
    a) a buffer for receiving the packet;
    b) means for receiving the starting sequence signal transmitted from the transmitter;
    c) means for comparing the first and second character strings for the starting sequence signal to first and second pre-determined character strings;
    d) means for resetting the buffer so that it may receive the packet if the first and second character strings match the first and second pre-determined character strings, respectively;
    e) means for receiving the ending sequence signal transmitted from the transmitter;
    f) means for comparing the third and fourth character strings of the ending sequence signal to third and fourth pre-determined character strings;
    g) means for accepting the packet if the third and fourth character strings match the third and fourth pre-determined character strings, respectively; and h) means for disregarding the received packet if the third and fourth character strings do not match the third and fourth pre-determined character strings.

9. The apparatus of claim 8 further comprising:
a) means for processing the received packet if the third and fourth character strings both match the third pre-determined character string; and
b) means for resetting the buffer if the third and fourth character strings both match the third pre-determined character string.

10. The apparatus of claim 8 wherein the packet contains a field that corresponds to the number of bits in the packet, further wherein the apparatus further comprises means for disregarding the packet if it has too many bits.

11. The apparatus of claim 10 wherein the apparatus further comprises means for disregarding the packet if it has too few bits after the ending sequence is successfully received.

12. The apparatus of claim 8 wherein the packet has a checksum field, further wherein the apparatus further comprises means for disregarding the packet if there is a checksum error.

13. The apparatus of claim 8 wherein the first and third pre-determined character strings correspond to break interrupts, the second pre-determined character string corresponds to one pre-determined hexadecimal character, and the fourth pre-determined character string corresponds to another pre-determined hexadecimal character.

14. The apparatus of claim 13 wherein the packet is transmitted at a predetermined bandwidth, further wherein the first and third character strings are received outside the bandwidth and the second and fourth character strings are received within the bandwidth.

15. A fault-tolerant method of communicating data between a transmitter and a receiver wherein the receiver has a buffer, further wherein the data is embodied in a packet having a number of bits, the method comprising the steps of:
a) transmitting a starting sequence signal, the starting sequence signal including a first character string followed by a second character string;
b) receiving the starting sequence signal;
c) comparing the first and second character strings for the starting sequence signal to first and second pre-determined character strings;
d) resetting the buffer so that it may receive the packet if the first and second character strings match the first and second pre-determined character strings, respectively;
e) transmitting the packet of information after the starting sequence signal has been transmitted;
f) transmitting an ending sequence signal after the packet has been transmitted, the ending sequence signal including a third character string followed by a fourth character string;
g) receiving the ending sequence signal;
h) comparing the third and fourth character strings of the ending sequence signal to third and fourth pre-determined character strings;
i) accepting the packet if the third and fourth character strings match the third and fourth pre-determined character strings, respectively; and
j) disregarding the received packet if the third and fourth character strings do not match the third and fourth pre-determined character strings.

16. The method of claim 15 further comprising the steps of:
a) processing the received packet if the third and fourth character strings both match the third pre-determined character string; and
b) resetting the buffer if the third and fourth character strings both match the third pre-determined character string.

17. The method of claim 15 wherein the packet contains a field that corresponds to the number of bits in the packet, the method further comprising the step of disregarding the packet if it has too many bits.

18. The method of claim 17 further comprising the step of disregarding the packet if it has too few bits after the ending sequence is successfully received.

19. The method of claim 15 wherein the packet has a checksum field, the method further comprising the step of disregarding the packet if there is a checksum error.

20. The method of claim 15 wherein the first and third pre-determined character strings correspond to break interrupts, the second pre-determined character string corresponds to one pre-determined hexadecimal character, and the fourth pre-determined character string corresponds to another pre-determined hexadecimal character, further wherein the step of transmitting the packet of information comprises transmitting the packet of information at a predetermined bandwidth.

21. The method of claim 20 wherein the step of transmitting the starting sequence signal comprises:
a) transmitting the first character string outside of the predetermined bandwidth; and
b) transmitting the second character string within the predetermined bandwidth.

22. The method of claim 21 wherein the step of transmitting the ending sequence signal comprises:
a) transmitting the third character string outside of the predetermined bandwidth; and
b) transmitting the fourth character string within the predetermined bandwidth.

* * * * *